Jan. 30, 1968 E. L. SWARTZ 3,366,131
FLUID LOGIC ELEMENT
Filed June 24, 1965
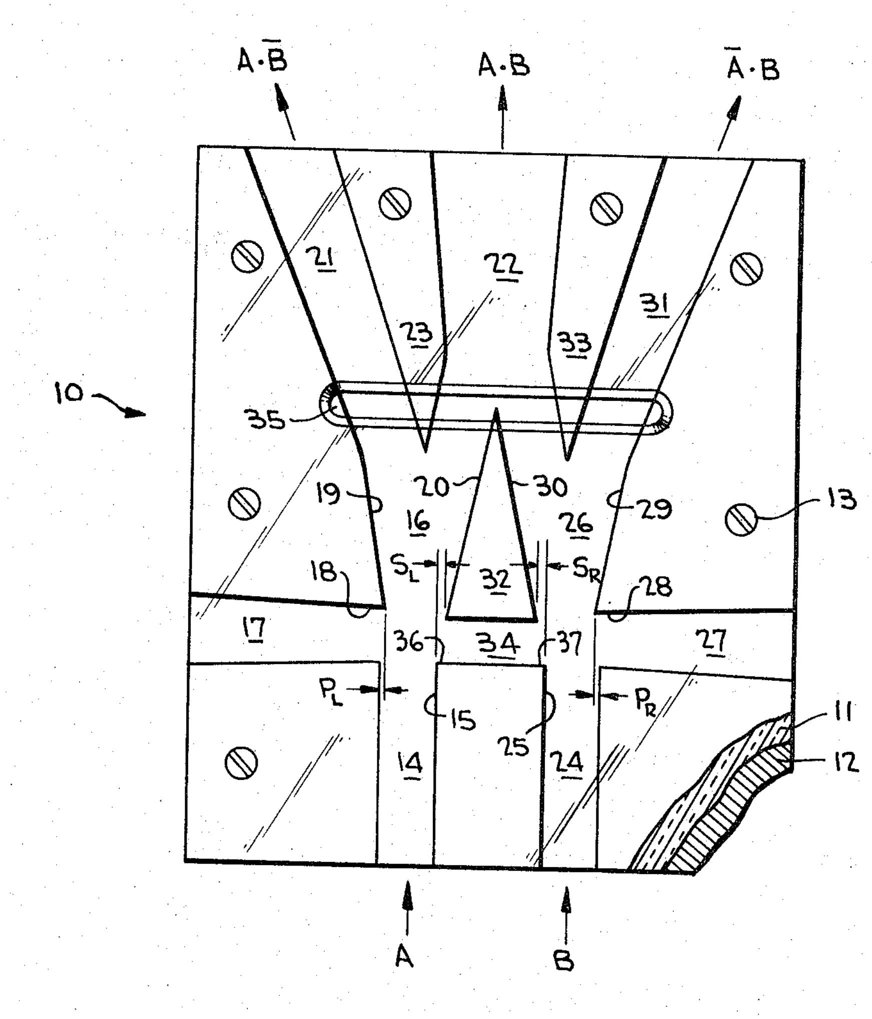
INVENTOR.
ELMER L. SWARTZ
BY: Harry M. Saragovitz,
Edward J. Kelly,
Herbert Berl &
J. D. Edgerton

1

3,366,131

FLUID LOGIC ELEMENT

Elmer L. Swartz, Falls Church, Va., assignor to the United States of America as represented by the Secretary of the Army Filed June 24, 1965, Ser. No. 466,867
6 Claims. (Cl. 137—81.5)

ABSTRACT OF THE DISCLOSURE

A pure fluid element utilizing wall attachment effects to perform the AND logic function on two parallel input streams. There are three output receivers which signify when only one stream is present, when both streams are present and when only the other stream is present, respectively. Each input stream is directed into an interaction chamber, the interaction chambers being separated by a common divider and in fluid communication with each other at the upstream and downstream ends of the divider.

The invention described herein may be manufactured and used by or for the Government of the United States of America for governmental purposes without the payment to me of any royalty thereon.

This invention relates generally to fluid systems and more particularly to an improved pure fluid component that will perform the AND logic function.

The Boolean AND function is one of the most common logic functions that is performed in digital computers. In Boolean algebra, there are only two basic quantities or values which come into consideration. These two values are designated 1 and 0, depending on whether the output or input signal is present or absent, or whether an input or output signal is a higher or lower level than the other. An AND logic element, more commonly termed an AND gate, is a circuit or device that produces an output signal having a value of 1 only when both input signals are present, that is, when both input signals have values equal to 1.

In electronic computers, transistor diodes are commonly used as AND gates. In electromechanical computers, relay type switches are generally used to perform the AND logic function. In pure fluid logic circuitry, the input signals take the form of streams of pressurized fluid. One type of fluid AND gate that is presently being used utilizes two input streams that impinge on one another at right angles. Another unit utilizes input streams that impinge on one another in a head-on relation. These units are referred to as the crossover type AND unit and the opposed input type AND unit, respectively. Both have the common disadvantages of turbulence losses and of occasional spurious signals as a result of the sharp turning of the streams after they interact with one another to produce the output signal. In addition, these units have relatively low gain. Gain, in this case, refers to the maximum variations of amplitude and pressures between the two input signals. In the crossover type AND unit, which is more efficient than the opposed input type AND unit, gains of up to 3 to 1 have been achieved.

In building various types of computing units such as counters, timers, registers, and the like, it is often desirable and necessary to have units that perform their logic functions, and particularly the AND function, with wide differences in the input signal streams, i.e., having higher gains than 3 to 1.

It is therefore an object of this invention to provide a pure fluid device for performing the AND logic function over a wide range in input signal strengths.

It is another object of this invention to provide a pure

2 fluid logic element that responds quickly and efficiently to two input signals.

A further object of the instant invention is to provide a pure fluid logic element that may be switched to produce the AND function without the fluid input signals interacting with one another.

Still another object of the invention is to provide an AND logic element that is reliable, simple, economical to manufacture, and that has no moving parts.

According to the present invention, the foregoing and other objects are attained by providing a pure fluid element that performs the AND logic function on two parallel input streams by means of wall attachment effects. The streams are directed into a pair of adjacent interaction chambers that are separated by a common divider and which are in fluid communication with one another at their upstream and downstream ends. The element is provided with three output receivers which signify when one stream only is present, when both streams are present, and when the other stream only is present. When either of one of the input streams is present by itself, it attaches to the outer wall of its interaction chamber and entrains fluid from the other interaction chamber. If now the other stream appears in the adjacent interaction chamber, a low pressure area will be created in the passage that provides the fluid communication between the upstream ends of the interaction chambers thereby causing the streams to attach to the inner walls of the respective interaction chambers, which walls are also the walls of the common divider. The two streams will then combine and flow out the output, signifying that both streams or input signals are present.

The specific nature of the invention, as well as other objects, aspects, uses and advantages thereof, will clearly appear from the following description and from the accompanying drawing, in which the sole figure shows a plan view of the fluid logic element according to the invention.

Referring now to the drawing, the logic element 10 is shown as being the planar type and may, for example, be constructed from a series of laminae that have been cut out to provide the nozzles, passages, and chambers by any conventional method such as cutting, stamping, etching or molding. For purposes of illustration, a clear plastic or glass top plate 11 is shown secured in a fluid-type relation to a bottom plate 12, which may be constructed of a material such as plastic, glass, or metal. Plates 11 and 12 are shown conveniently secured to one another by means of screws 13.

The two input signals, designated as A and B in accordance with the usual Boolean notation, are presented to the logic element 10 in the form of streams of pressurized fluid from other units within the entire fluid system (not shown). Fluid signal A enters the logic element 10 by way of an input passage 14 and emanates as a stream of fluid from orifice or nozzle 15 into an interaction chamber 16. A left open control channel 17 provides fluid communication between the ambient and interaction chamber 16 and terminates in a control nozzle 18, located immediately downstream of the A signal input nozzle 15. Left control channel 17 serves as a bleed channel and is preferably constructed so as to have a larger opening into the ambient as compared with control nozzle 18. Interaction chamber 16 is bounded on the left by an outer wall 19 and on the right by an inner wall 20. Outer wall 19 of the interaction chamber 16 leads into a left output receiver 21. Inner wall 20 leads into a central receiver 22. Separating the left output receiver 21 and the central output receiver 22 is a divergent divider 23.

Input signal B enters logic element 10 by way of an input passage 24 which is parallel to input passage 14. Input passage 24 terminates in an input nozzle 25 from which the B signal input stream emanates as a stream of fluid into an interaction chamber 26. A right open control channel 27 provides fluid communication between the interaction chamber 26 and the ambient. This channel terminates in a control nozzle 28 immediately downstream of the B input signal nozzle 25 and has a larger opening at the ambient as compared with the control nozzle 28. Interaction chamber 26 is bounded on the right by an outer wall 29 and on the left by an inner wall 30. Outer wall 29 leads into a right output receiver 31 while the inner wall 30 leads into the central output receiver 22. Divider 33 separates the central output receiver 22 from the right output receiver 31. Inner walls 20 and 30 of their respective interaction chambers are also the side walls of a central triangular-shaped divider 32 which in effect separates the two interaction chambers 16 and 26. The interaction chamber inner walls 20 and 30 are set back a slight amount from input nozzles 15 and 25, respectively, so that fluid streams issuing from the input nozzles will tend to lock on to the outer walls 19 and 29 and not to the inner walls due to the well-known boundary layer effect. The amount of setback is shown by $S_L$ and $S_R$. To further increase the tendency of the streams issuing from the input nozzles to attach to the outer walls of their respective interaction chambers, outer walls 19 and 29 are made to project slightly beyond the outer walls of left and right input nozzles 15 and 25. The amount of projection is shown by $P_L$ and $P_R$, and is preferably less than the amount of setback $S_L$ and $S_R$. A mutual control channel 34 provides fluid communication between interaction chamber 16 and interaction chamber 26 at their upstream ends and is positioned transverse to the A and B input signal passages 14 and 24, respectively. Mutual control channel 34 opens into the upstream portions of interaction chambers 16 and 26 in control ports 36 and 37, respectively. These ports are preferably slightly smaller than the open control nozzles 18 and 28.

In order to provide impedance matching of the logic unit 10 with other fluid elements, a bleed to the ambient is furnished by means of an elongated slot-like aperture 35. Bleed aperture 35 bridges the left output receiver 21, central output receiver 22, and the right output receiver 31.

In the operation of the fluid AND gate 10, a fluid signal applied to either the A or B input will issue from its respective nozzle as a stream of fluid and will attach to the outer wall of its own interaction chamber to produce an output signal in the left output receiver 21 or the right output receiver 31. Assuming that a signal is applied at the A input, the fluid stream emanating from input nozzle 15 will entrain fluid from the left control channel 17 and the mutual control channel 34 as it enters interaction chamber 16. The stream will also entrain fluid between itself and the inner and outer walls 19 and 20 of interaction chamber 16, but because of the setback $S_L$ of divergent inner wall 20, the stream will remove fluid between itself and the outer wall 19 at a greater rate. The pressure on the left side of the stream will be decreased sufficiently to cause the stream to lock on to outer wall 19 and flow out receiver 21. Also, since the upstream edge of outer wall 19 projects slightly into the stream issuing from nozzle 15, a low pressure region will be created in the left control nozzle 18. This results from a vortex that will be formed in the nozzle by a portion of the stream that will be "peeled off" by the projecting wall edge. This low pressure region corresponds to the separation bubble in the well known two dimensional jet reattachment situation, and greatly increases the tendency of the stream to attach to wall 19. It will be obvious to those skilled in the art that other methods may be employed to cause the stream to normally attach to the outer wall 19. One method, for example, is to round off the corner formed by input nozzle 15 and control nozzle 18.

The presence of a fluid stream in output receiver 21 may be expressed in Boolean terms as $A \cdot \overline{B}$ which means that there is fluid flow in input passage 14 and not in input passage 24. As a result of the entrainment of fluid from the mutual control channel 34 while the stream is producing an output flow in receiver 21, a low pressure region will be created in this channel. With this low pressure existing in the mutual control channel 34, should a signal appear in the B input, the stream issuing from nozzle 25 will incline to the left and attach to inner wall 30 of interaction chamber 26. The B signal stream by attaching to inner wall 30 will further decrease the pressure in the mutual control channel 34 and will cause the A signal input stream to switch to the right and lock on to inner wall 20 of interaction chamber 16. The streams, now attached to inner walls 20 and 30, will combine downstream of divider 32 and produce a fluid flow out the central output receiver 22. The presence of fluid flowing in receiver 22 signifies the AND function, or as expressed in Boolean terminology, $A \cdot B$, which means that there is a fluid input signal A and a fluid input signal B.

If one of the inputs A or B ceases to flow, the other stream will immediately switch back and attach to the outer wall of its interaction chamber due to the absence of sufficient negative pressure in the mutual control channel 34 to maintain attachment of the stream to its inner wall.

Fluid logic element 10 operates in a similar manner when there is only a fluid input signal in the B input passage 24, i.e., the fluid stream issuing from B input passage nozzle 25 will attach to outer wall 29 of interaction chamber 26 and flow out the output receiver 31, thereby producing the output signal $\overline{A} \cdot B$. Accordingly, should a fluid input signal appear in the A input, the stream emanating from the A input nozzle 15 will be caused to lock on to inner wall 20 and thereby influence the switching of the B fluid stream to the left to lock on to inner wall 30.

To ensure that the fluid streams continue to produce the proper output signal when the output receivers are loaded, the bleed aperture 35 is provided and serves to maintain wall attachment of the stream or streams by relieving the back pressure in the loaded output receiver. The logic element is therefore self-matching to other units in the system.

There are many combinations of interaction chamber wall angles, set-back, divider or splitter positions, control sizes, etc., that may be used to achieve the desired characteristics of the fluid logic element. However, regardless of the particular combination employed, the principle of the mutual control and the operation of the logic gate remain the same. Since each input fluid stream aids in developing the negative pressure in the mutual control channel 34, switching of the fluid streams will occur with wide differences in the input signal strengths. It is this negative or reduced pressure in the mutual control channel 34 that is the switching signal. By employing this technique of mutual control, parallel input AND gates can be built to perform the logic function with variations in input signal amplitudes of 10 to 1.

It will be apparent that the embodiment shown is only exemplary and that various modifications can be made in construction and arrangement within the scope of the invention as defined in the appended claims.

I claim as my invention:

1. A pure fluid element for performing the AND logic function, comprising:

(a) first nozzle means for issuing a first stream of fluid in response to a first fluid input signal into a first interaction chamber having diverging inner and outer boundary walls;

(b) second nozzle means for issuing a second stream of fluid in response to a second fluid input signal into a second interaction chamber having diverging inner and outer boundary walls;

(c) first receiver means downstream of said first interaction chamber for producing an output signal only when said first fluid input signal is present and said second fluid input signal is not present;

(d) second receiver means downstream of said second interaction chamber for producing an output signal only when said second fluid input signal is present and said first input signal is not present;

(e) third receiver means downstream of said first and said second interaction chambers for producing an output signal when said first and said second fluid input signals are present;

(f) divider means separating said first and second interaction chambers from one another being formed in part by said inner walls of said interaction chambers, said inner walls being set back from said first and said second nozzle means, whereby said first and second fluid streams issuing from said nozzle means will attach to said outer walls of said interaction chambers when only one input signal is present;

(g) mutual control channel means providing fluid communication between said interaction chambers at the upstream ends thereof, whereby sufficient negative pressure is produced in said mutual control channel means when said first and said second fluid input signals are present to cause said first and second streams to attach to said walls of said divider means and flow into said central receiver means thereby producing the AND output signal; and (h) open control channel means for providing fluid communication between the ambient and said interaction chambers at the upstream ends thereof, whereby fluid is entrained from said channel means as said streams issue from said nozzles into said interaction chambers.

2. The pure fluid element according to claim 1, wherein said first and second nozzle means are arranged to issue said streams in parallel relation to one another.

3. The pure fluid element according to claim 2, wherein said mutual control channel means is transverse to and located immediately downstream of said first and second nozzle means.

4. The pure fluid element according to claim 3, wherein said open control channel means terminates in a control nozzle adjacent said first nozzle means and terminates in another control nozzle adjacent said second nozzle means.

5. The pure fluid element according to claim 4, wherein:

(a) said open control channel means is in substantially linear alignment with said mutual control channel means, and (b) said mutual control channel means terminates in ports which are smaller than said control nozzles, whereby (c) said streams entrain fluid from said mutual control channel at a greater rate than from said open control channel means.

6. The pure fluid element according to claim 5, wherein bleed aperture means provides fluid communication between each of said output receiver means and the ambient, whereby said fluid element exhibits self-matching characteristics.

References Cited

UNITED STATES PATENTS

| | | | |
|---|---|---|---|
| 3,080,886 | 3/1963 | Severson | 137—81.5 |
| 3,107,850 | 10/1963 | Warren et al. | 137—81.5 |
| 3,277,915 | 10/1966 | Dockery | 137—81.5 |

M. CARY NELSON, *Primary Examiner.*

W. R. CLINE, *Assistant Examiner.*